US012259100B1

(12) United States Patent
Park et al.

(10) Patent No.: US 12,259,100 B1
(45) Date of Patent: Mar. 25, 2025

(54) THICK APPEARANCE LENS USING REFLECTIVE SURFACES

(71) Applicant: GM GLOBAL TECHNOLOGY OPERATIONS LLC, Detroit, MI (US)

(72) Inventors: Jonglee Park, Novi, MI (US); Stephen Ericson, Oxford, MI (US); Michael K. Larsen, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/676,604

(22) Filed: May 29, 2024

(51) Int. Cl.

| | |
|---|---|
| ***F21S 41/20*** | (2018.01) |
| ***F21S 41/151*** | (2018.01) |
| ***F21S 41/32*** | (2018.01) |
| ***F21S 43/14*** | (2018.01) |
| ***F21S 43/20*** | (2018.01) |
| ***F21S 43/31*** | (2018.01) |

(Continued)

(52) U.S. Cl.
CPC ........... *F21S 41/285* (2018.01); *F21S 41/151* (2018.01); *F21S 41/32* (2018.01); *F21S 43/14* (2018.01); *F21S 43/2605* (2024.05); *F21S 43/31* (2018.01); *F21Y 2113/13* (2016.08); *F21Y 2115/10* (2016.08)

(58) Field of Classification Search
CPC ........ F21S 41/285; F21S 41/151; F21S 41/32; F21S 43/14; F21S 43/31; F21S 43/2605
See application file for complete search history.

(56) References Cited

U.S. PATENT DOCUMENTS

| | | | | |
|---|---|---|---|---|
| 6,991,355 B1 * | 1/2006 | Coushaine | F21K 9/00 362/555 |
| 7,837,348 B2 * | 11/2010 | Narendran | F21V 5/004 362/558 |
| 9,732,937 B2 | 8/2017 | Wang et al. | |

(Continued)

FOREIGN PATENT DOCUMENTS

| | | |
|---|---|---|
| DE | 102010046342 A1 | 3/2012 |
| DE | 202018102965 U1 | 7/2018 |
| JP | 2002109905 A | 4/2002 |

OTHER PUBLICATIONS

German Office Action for German Application No. 102024121347.7; dated Jan. 31, 2025; 9 pages.

*Primary Examiner* — Christopher E Dunay
(74) *Attorney, Agent, or Firm* — CANTOR COLBURN LLP

(57) ABSTRACT

Aspects of the disclosure include a relatively thin lens that leverages reflective surfaces to provide a thick lens appearance and methods of manufacturing the same. An exemplary vehicle includes a component having a lens. The lens includes a light pipe configured such that opposite sidewalls of the light pipe face each other across an airgap, a first reflector surface having a first reflective material formed on a first sidewall of the opposite sidewalls, a second reflector surface having a second reflective material formed on a second sidewall of the opposite sidewalls, and a third surface positioned between the first reflector surface and the second reflector surface and configured such that light can pass through the third surface and into the airgap. A path of light within the airgap is elongated due to internal reflections between the first reflector surface and the second reflector surface, thereby providing an infinity mirror effect.

20 Claims, 6 Drawing Sheets

(51) Int. Cl.

| | |
|---|---|
| *F21Y 113/13* | (2016.01) |
| *F21Y 115/10* | (2016.01) |

(56) References Cited

U.S. PATENT DOCUMENTS

| | | | | |
|---|---|---|---|---|
| 2008/0118215 | A1 | 5/2008 | Chen et al. | |
| 2008/0170392 | A1 * | 7/2008 | Speier | G02B 7/008<br>362/227 |
| 2014/0312371 | A1 * | 10/2014 | Wong | F21V 33/0004<br>257/98 |
| 2017/0211770 | A1 * | 7/2017 | Schmidt | F21S 41/143 |
| 2019/0179218 | A1 * | 6/2019 | Jagt | F21V 9/30 |
| 2019/0278018 | A1 * | 9/2019 | Angelini | G02B 6/0008 |
| 2023/0213776 | A1 | 7/2023 | Rabis et al. | |

* cited by examiner

THICK APPEARANCE LENS USING REFLECTIVE SURFACES

INTRODUCTION

The subject disclosure relates to lighting systems and lenses, and particularly to a relatively thin lens that leverages reflective surfaces to provide a thick lens appearance.

Lighting systems play a pivotal role in enhancing the aesthetics, functionality, and ambiance of spaces across various domains, ranging from architecture and interior design to automotive and entertainment industries. Central to these systems are light sources and lenses, which work in tandem to control and manipulate the distribution, intensity, direction, and quality of light. Light sources are the fundamental components that emit light energy, such as incandescent bulbs, fluorescent tubes, LEDs (light-emitting diodes), halogen lamps, etc. Each light source type offers different color temperatures, energy efficiency levels, and lifespans, allowing lighting systems to be tailored to the specific needs of a given application.

Lenses, in the context of lighting systems, are optical elements designed to modify the behavior of light emitted from the light source. Lenses can be made from various materials, such as glass or plastics, and can control factors such as the angle of light dispersion, beam width, and focus. Lenses can be used to direct light in a specific direction, diffuse it for even illumination, and/or create visually appealing effects by refracting or reflecting light. When integrated with a light source in a lighting system, a lens can produce a range of lighting effects, such as focusing light in a specific area or scattering it for a more diffuse illumination (directionality), determining how wide or narrow the light distribution will be (beam control), alter the color temperature or color rendering properties of the light (color and color temperature control), as well as various specialized visual effects, such as a lens flare, halo effects, and/or light patterns.

SUMMARY

In one exemplary embodiment a vehicle includes a component having a lens. The lens includes a light pipe configured such that opposite sidewalls of the light pipe face each other across an airgap, a first reflector surface having a first reflective material formed on a first sidewall of the opposite sidewalls, a second reflector surface having a second reflective material formed on a second sidewall of the opposite sidewalls, and a third surface positioned between the first reflector surface and the second reflector surface and configured such that light can pass through the third surface and into the airgap. A path of light within the airgap is elongated due to internal reflections between the first reflector surface and the second reflector surface, thereby providing an infinity mirror effect.

In addition to one or more of the features described herein, in some embodiments, the light pipe includes a nominal sidewall thickness of less than 5.0 mm.

In some embodiments, the third surface is substantially free of reflective material, excepting only portions of the third surface covered due to a thickness of the first reflector surface and a thickness of the second reflector surface.

In some embodiments, the first reflective material and the second reflective material are the same.

In some embodiments, the component further includes a light source having one or more micro light emitting diodes (LEDs).

In some embodiments, the one or more micro LEDs includes a first micro LED positioned within the airgap such that light emitted from the first micro LED is reflected between the first reflector surface and the second reflector surface through the airgap.

In some embodiments, the one or more micro LEDs includes a second micro LED positioned such that light emitted from the second micro LED is refracted against one of the first reflector surface and the second reflector surface through the light pipe.

In another exemplary embodiment a lens includes a light pipe configured such that opposite sidewalls of the light pipe face each other across an airgap, a first reflector surface having a first reflective material formed on a first sidewall of the opposite sidewalls, a second reflector surface having a second reflective material formed on a second sidewall of the opposite sidewalls, and a third surface positioned between the first reflector surface and the second reflector surface and configured such that light can pass through the third surface and into the airgap. A path of light within the airgap is elongated due to internal reflections between the first reflector surface and the second reflector surface, thereby providing an infinity mirror effect.

In some embodiments, the light pipe includes a nominal sidewall thickness of less than 5.0 mm.

In some embodiments, the third surface is substantially free of reflective material, excepting only portions of the third surface covered due to a thickness of the first reflector surface and a thickness of the second reflector surface.

In some embodiments, the first reflective material and the second reflective material are the same.

In some embodiments, the component further includes a light source having one or more micro light emitting diodes (LEDs).

In some embodiments, the one or more micro LEDs includes a first micro LED positioned within the airgap such that light emitted from the first micro LED is reflected between the first reflector surface and the second reflector surface through the airgap.

In some embodiments, the one or more micro LEDs includes a second micro LED positioned such that light emitted from the second micro LED is refracted against one of the first reflector surface and the second reflector surface through the light pipe.

In yet another exemplary embodiment a method can include providing a light pipe configured such that opposite sidewalls of the light pipe face each other across an airgap, forming a first reflector surface on a first sidewall of the opposite sidewalls, the first reflector surface including a first reflective material, forming a second reflector surface on a second sidewall of the opposite sidewalls, the second reflector surface including a second reflective material, and forming a third surface positioned between the first reflector surface and the second reflector surface, the third surface configured such that light can pass through the third surface and into the airgap. In some embodiments, a path of light within the airgap is elongated due to internal reflections between the first reflector surface and the second reflector surface, thereby providing an infinity mirror effect.

In some embodiments, the light pipe includes a nominal sidewall thickness of less than 5.0 mm.

In some embodiments, the third surface is substantially free of reflective material, excepting only portions of the third surface covered due to a thickness of the first reflector surface and a thickness of the second reflector surface.

In some embodiments, the first reflective material and the second reflective material are the same.

In some embodiments, the component further includes a light source having one or more micro light emitting diodes (LEDs).

In some embodiments, the one or more micro LEDs includes a first micro LED positioned within the airgap such that light emitted from the first micro LED is reflected between the first reflector surface and the second reflector surface through the airgap.

In some embodiments, the one or more micro LEDs includes a second micro LED positioned such that light emitted from the second micro LED is refracted against one of the first reflector surface and the second reflector surface through the light pipe.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
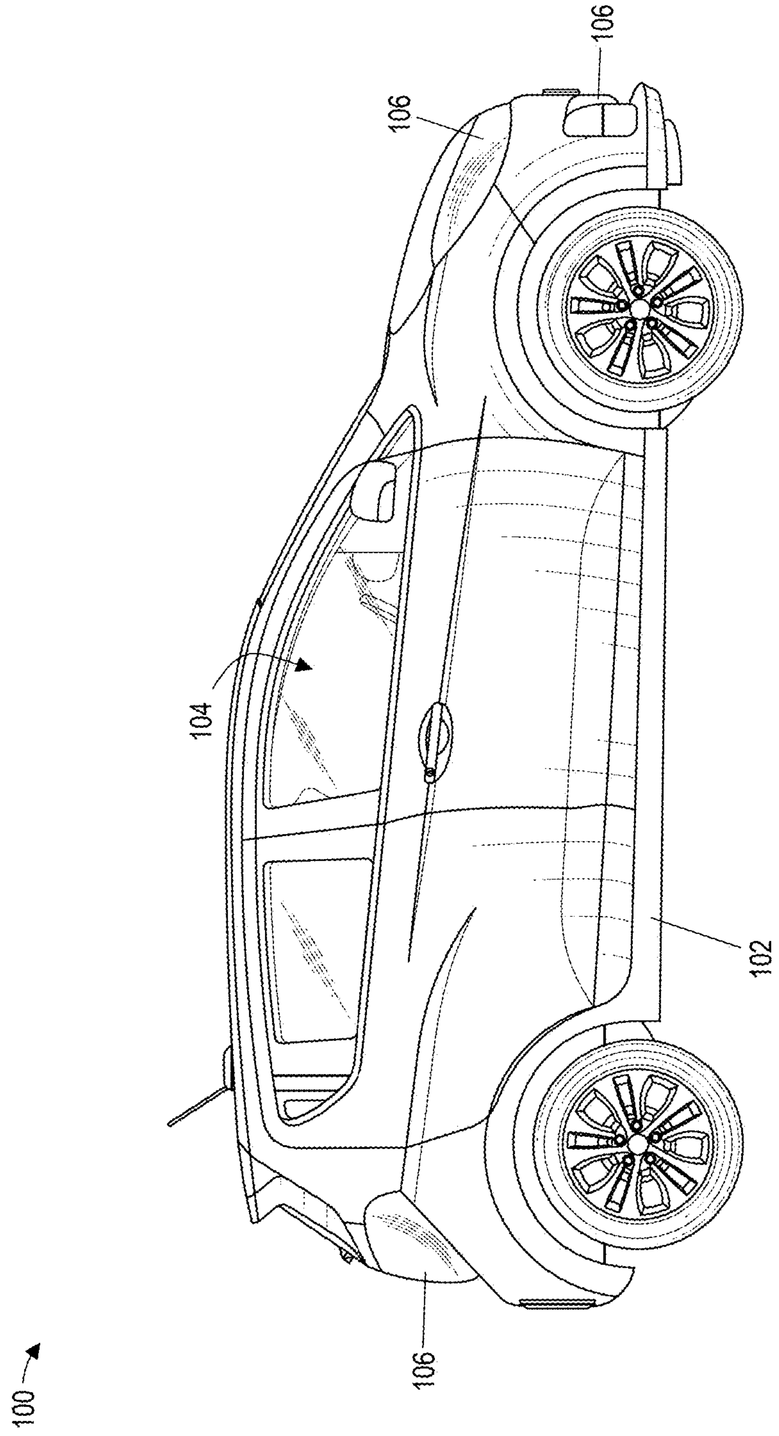
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Lenses are one of the primary components of many lighting systems. While lenses can provide a range of functional benefits to a lighting system, such as focusing light, collimating or parallelizing light, beam shaping, magnification or demagnification, dispersion, and/or image formation, lenses can also contribute to the overall aesthetics of a lighting system. For example, so-called thick lenses, also known as thick optics or light blades, have gained popularity in various applications, particularly in the automotive industry for headlamp designs. Thick lenses aim to create a visually striking and distinctive aesthetic while also offering functional benefits. As used herein, a "thick lens" refers to a lens having a light blade construction with a thickness of at least 5.0 mm. Conversely, a "thin lens", or standard lens, is a lens having a thickness of less than 5.0 mm. For example, the typical thickness of plastic lens subcomponents is about 2.5 mm. Thus, a thick lens is a lens having a thickness that is at least twice the thickness of a standard 2.5 mm lens. Thick lenses can be even thicker, with wall thicknesses of greater than 20 mm, for example 24 mm, 30 mm, 50 mm, etc. Thick lenses create a bold, substantial, and premium appearance, especially when viewed from the front. Moreover, a thick, solid looking lens adds a sense of strength and the implication of improved durability.

Unfortunately, current manufacturing processes for thick lens applications are limited to the use of physically thick lens parts, often produced using relatively thick lens injection molds. In this way, however, the mass of the resulting thick lens will be significantly increased with respect to standard lenses. In fact, the mass of a thick lens having a thickness of 24 mm can be more than eight times the mass of a standard lens having a thickness of 2.5 mm. Increasing the mass of various components of a vehicle can result in a range of negative impacts, such as exceeding packaging design weight limitations and decreasing driving distance in an electric vehicle. In addition, such thick lenses naturally require more materials, molding process timing, and part cost to achieve the desired thickness. Other challenges include thermal management, as a physically thick lens can make it more difficult to dissipate heat generated by high-intensity light sources, and reduced optics quality, as a physically thick lens can increase optical losses due to reflections and absorption, potentially reducing overall light output efficiency.

This disclosure introduces a relatively thin lens having a thick lens appearance. Rather than relying on a physically thick lens for thick lens applications, the present disclosure introduces a way to leverage reflective surfaces to give the appearance of a thick lens to a thin lens, thereby avoiding many of the inherent tradeoffs of a physically thick lens. The result is a new lens architecture that offers the aesthetic qualities of a thick lens while remaining lighter than thick lenses and that can be manufactured using less materials and at relatively lower processing times (e.g., lower mold process timing).

In some embodiments, a thin lens is constructed as a light pipe having relatively thin sidewalls (e.g., less than 5.0 mm as in a standard lens construction) which are bent such that the opposite sidewalls of the light pipe face each other. The sidewalls of the light pipe which face each other are then coated with a reflective surface. The so-called faced reflector surfaces create a thick lens appearance due to an infinity mirror effect, not unlike refractive optics having total internal reflection (TIR). As used herein, an "infinity mirror effect" refers to the visual illusion created when two or more parallel mirrors face each other, as this arrangement causes a seemingly infinite series of reflections that appear to recede into the distance indefinitely. The faced reflective surfaces can be installed by metallization processes and/or by multilayer coating processes to tune the degree of light reflection as desired. In some embodiments, the faced reflective surfaces are configured with stylized patterns to further enhance the unlit and/or lit appearance of the lighting system in which the lens is installed. Notably, light sources can be optionally positioned below and/or within an airgap cavity defined by the faced reflector surfaces to allow for lighted light blade features. In some embodiments, the housing or bezel of a lighting system can be combined together with one half of a bent light pipe to provide the same thick lens appearance. Advantageously, the light pipe (also referred to as a lens shell design) can have a mass that is only 25 percent or less the mass of an equivalently sized physically thick lens. For example, a physically thick lens having a width of 24 mm will have nearly 4 times the mass of a thin lens light pipe having a width of 24 mm, as the thin lens will have an airgap cavity that is 60 percent or more (e.g., 60, 65, 70, 75, 80, 85, 90, 95 percent) the total width.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Body 102 also includes a number of glass, plastic, and/or polymer laminate lighting assemblies 106 (also referred to as lighting units or lamp housings) housing a variety of lighting elements, such as, for example, front headlights, rear taillights, turn signals, reverse lights, decorative lighting, etc.

The particular lighting assemblies 106 emphasized in FIG. 1 (i.e., the front headlight, turn signal, rear passenger window, and taillights) are emphasized only for ease of illustration and discussion. It should be understood that any aspect of the present disclosure can be applied to any lenses in the vehicle 100. In addition, the location, size, arrangement, etc., of the lighting assemblies 106 and the shape, size, positioning, etc. of their elements (e.g., lenses) is not meant to be particularly limited, and all such configurations are within the contemplated scope of this disclosure. Moreover, while discussed primarily in the context of a lighting assembly 106 of a vehicle 100, aspects described herein can be similarly incorporated within any system (vehicle, building, work piece, or otherwise) having one or more lens elements, and all such configurations and applications are within the contemplated scope of this disclosure.

As will be detailed herein, one or more of the lighting assemblies 106 includes a thin lens light pipe having a thick lens appearance. An illustrative thin lens light pipe is discussed in greater detail with respect to FIG. 2. An example holding jig for selectively metalizing a thin lens light pipe is discussed with respect to FIG. 3. Alternative thin lens light pipe configurations are discussed with respect to FIGS. 4A, 4B, 4C, and 4D. Example microstructures for a thin lens are discussed with respect to FIGS. 5A, 5B, 5C, 5D, 5E, and 5F.

Figure 2:
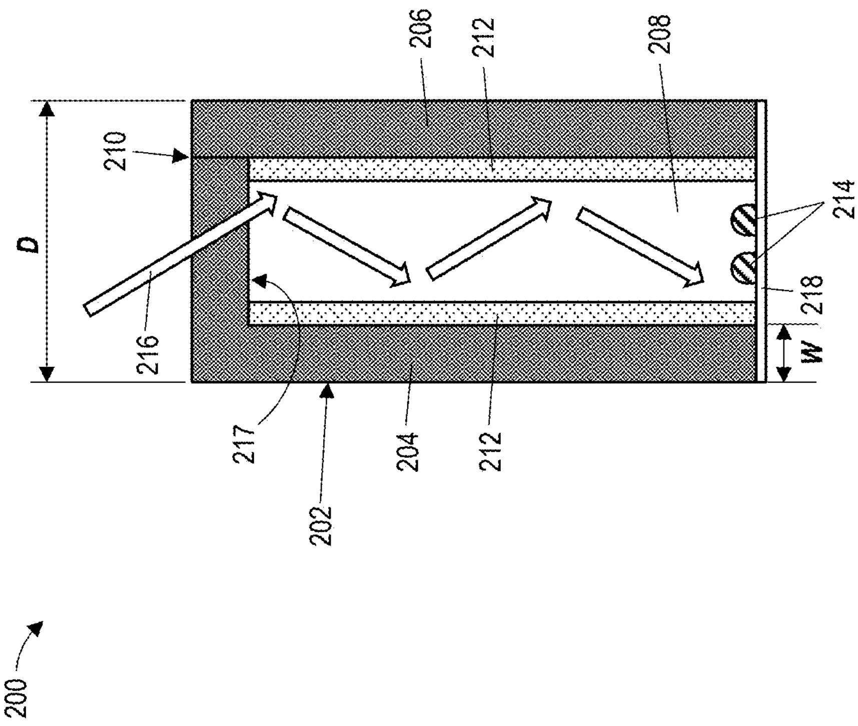
FIG. 2 is a cross-sectional view of a thin lens in accordance with one or more embodiments.

FIG. 2 illustrates a cross-sectional view of a thin lens 200 in accordance with one or more embodiments. The thin lens 200 can be incorporated within any component of any system having at least one lens element (e.g., the lighting assembly 106 of the vehicle 100 of FIG. 1). As shown in FIG. 2, the thin lens 200 includes a light pipe 202 that is configured (e.g., bent, curved, etc.) such that opposite sidewalls 204, 206 of the thin lens 200 face each other across an airgap 208. While the configuration of the thin lens 200 is not meant to be particularly limited, the light pipe 202 can be bent, for example, into a "U" shape, "N" shape (as shown), and/or into any other shaped configuration having oppositely faced sidewalls (e.g., the thin lens 200 can have a domed and/or rounded topography as well).

In some embodiments, the light pipe 202 can have a nominal sidewall thickness W throughout (within tooling limits) of less than 5.0 mm. For example, the thickness W of the sidewalls 204, 206 can be 4.9 mm, 4.5 mm, 4.0 mm, 3.0 mm, 2.5 mm, 2.0 mm, 1.5 mm, 1.0 mm, 0.5 mm, etc. In some embodiments, the thickness W of the sidewalls 204, 206 are the same, or substantially the same within tooling limits. In some embodiments, the thickness W of the sidewalls 204, 206 are different (refer, e.g., to FIG. 4B).

In some embodiments, the thin lens 200 can have a total thickness (e.g., diameter) D of at least three times the thickness W. In some embodiments, the thin lens 200 can have a total thickness D of between 5.0 mm and 50.0 mm, for example, 8.0 mm, 10.0 mm, 12.0 mm, 15.0 mm, 18.0 mm, 20.0 mm, 22.0 mm, 24.0 mm, 26.0 mm, 28.0 mm, 30.0 mm, 40.0 mm, and 50.0 mm. In some embodiments, the thin lens 200 can have a total thickness D of greater than 50.0 mm, for example, 75.0 mm. Notably, the thin lens 200 can have a total thickness D that is greater than that achievable using physically thick lenses and conventional molding processes, which are typically limited to about 24 mm.

In some embodiments, the light pipe 202 can be constructed from two or more pieces (as shown, two pieces separated by a seam 210). The various pieces of the light pipe 202 can be fixed to one another using known processes, such as via adhesive and/or via interlocking parts, as desired. In some embodiments, the light pipe 202 can be constructed monolithically; that is, using a single lens component (not separately shown). Such as configuration can be achieved using, for example, a single lens mold having a "U" or "N" shape.

The light pipe 202 can be made of a range of transparent and semi-transparent materials suitable for overmolding. For example, the light pipe 202 can be made of benzoxazine, a bis-maleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-transparent layers thereof, and combinations thereof. In certain aspects, the light pipe 202 may include or be made of a thermoplastic transparent or semi-transparent layer selected from the group consisting of: polyethylenimine (PEI), polyamide-imide (PAI), polyamide (PA) (e.g., nylon 6, nylon 66, nylon 12, nylon 11, nylon 6-3-T), polyetheretherketone (PEEK), polyetherketone (PEK), Polyvinyl Chloride (PVC), a polyphenylene sulfide (PPS), a thermoplastic polyurethane (TPU), polypropylene (PP), polycarbonate/acrylonitrile butadiene styrene (PC/ABS), high-density polyethylene (HDPE), polyethylene terephthalate (PET), poly(methyl methacrylate) (PMMA), Styrene Methyl Methacrylate (SMMA), Methyl Methacrylate Acrylonitrile Butadiene Styrene (MABS), polycarbonate (PC), polyaryletherketone (PAEK), polyetherketoneketone (PEKK), co-transparent layers thereof, and combinations thereof.

In some embodiments, the airgap 208 can be filled with air. In some embodiments, the airgap 208 can be filled with another gas, such as argon and/or nitrogen, or a combination with or without air, as desired. In some embodiments, the airgap 208 is purged of gases prior to sealing the thin lens 200. For example, the airgap 208 can be placed under vacuum after sealing the seam 210 of the thin lens 200.

In some embodiments, faced reflector surfaces 212 are reflective layers formed on the opposite sidewalls 204, 206. In some embodiments, the faced reflector surfaces 212 are coated onto the sidewalls 204, 206. In some embodiments, the faced reflector surfaces 212 are deposited and/or metallized onto the sidewalls 204, 206. The manufacturing/formation of the faced reflector surfaces 212 is discussed in greater detail with respect to FIG. 3. In some embodiments, the faced reflector surfaces 212 are formed to a thickness of the order of a few microns, for example, between 0.5 microns and 8 microns, or between 2.0 and 6.0 microns, such as 4.0 microns.

In some embodiments, the faced reflector surfaces 212 are made of a reflective material having a reflectance (the fraction of incident electromagnetic radiation that is reflected from its surface) of at least 70 percent, for example 70, 80, 85, 90, 92, 94, 95, 96, 98, and 99 percent reflectance. The reflective material is not meant to be particularly limited, but can include, for example, a metal such as aluminum (Al), silver (Ag), gold (Au), copper (Cu), rhodium (Rh), chromium (Cr), zinc (Zn), and alloys and/or combinations thereof. Other materials include stainless steel, polymers such as polytetrafluoroethylene (PTFE) and polyethylene terephthalate (PET) having reflective additives, coatings, and/or surface treatments, and/or ceramics such as aluminum oxide ($Al_2O_3$) and zirconium oxide ($ZrO_2$), which can be polished to achieve a high degree (greater than 90 percent) of reflectivity. Still other materials include transparent conductive oxide (TCO) compounds, such as indium tin oxide ($In_2O_3$:Sn, ITO), fluorine-doped tin oxide (FTO), aluminum-doped zinc oxide (AZO), gallium-doped zinc oxide (GZO), indium zinc oxide (IZO), and combinations thereof. In some embodiments, the faced reflector surfaces 212 are made of a semi-reflective material having a reflectance between 30 and 70 percent. Example materials include, for example, dielectric coatings such as silicon dioxide ($SiO_2$), titanium dioxide ($TiO_2$), and magnesium fluoride ($MgF_2$), ITO and ITO alloys, tinted and/or coated glass such as low-emissivity (low-E) coatings, polycarbonate and acrylic sheets treated with coatings and/or surface modifications, metallized polymers such as PET and polycarbonate, and combinations thereof.

While shown having a single layer for ease of illustration, in some embodiments, one of both of the faced reflector surfaces 212 are multi-layered structures. For example, in some embodiments, the faced reflector surfaces 212 are dielectric Bragg mirrors having two or more layers. A dielectric Bragg mirror, also known as a dielectric reflector or dielectric mirror, is a type of optical component that reflects light through the principle of Bragg reflection and includes two or more alternating layers of dielectric materials having contrasting refractive indices. In some embodiments, the faced reflector surfaces 212 are dielectric Bragg mirrors having alternating high and low refractive index dielectric layers. Dielectric Bragg mirrors can achieve a very high reflectivity (e.g., greater than 99 percent) for a specific wavelength or range of wavelengths, depending on the number of layers and the refractive index contrast between the respective materials. Some common examples of alternating dielectric materials for Bragg mirrors include silicon dioxide ($SiO_2$) and titanium dioxide ($TiO_2$), silicon nitride ($Si_3N_4$) and silicon oxide ($SiO_2$), aluminum oxide ($Al_2O_3$) and magnesium fluoride ($MgF_2$), and tantalum pentoxide ($Ta_2O_5$) and silicon dioxide ($SiO_2$).

In some embodiments, one of both of the faced reflector surfaces 212 are made of, or include, a material selected to shift a natively-emitted light color from a light source (e.g., micro LEDs 214, discussed in further detail herein) to a color(s) specified by the chosen material. For example, in some embodiments, one or both of the faced reflector surfaces 212 includes a phosphor (e.g., red phosphor, yellow phosphor, etc.).

Red phosphors can be used to convert blue or ultraviolet (UV) light into red light. Red phosphors can include for example, compounds of rare-earth elements such as europium-doped yttrium vanadate ($YVO_4$:Eu), europium-doped yttrium oxide ($Y_2O_3$:Eu), yttrium aluminum garnet (YAG:Eu), yttrium aluminum borate (YAB:Eu), and yttrium orthovanadate ($YVO_4$:Eu). Green phosphors are used to convert blue or UV light into green light. Green phosphors commonly include rare-earth elements such as terbium (Tb) or europium (Eu), combined with other compounds to achieve the desired emission wavelength. Blue phosphors are used to convert UV light into blue light. Blue phosphors can include cerium (Ce)-activated compounds, such as cerium-doped yttrium aluminum garnet (YAG:Ce). Blue phosphors absorb UV light and emit blue light through a process called photoluminescence. Yellow phosphors are used to convert blue or UV light into yellow light. Yellow phosphors can include a combination of rare-earth elements like Ce, Tb, or Y with other compounds. Orange phosphors are used to convert blue or UV light into orange light. Orange phosphors can include Eu and Tb, along with other co-activators (e.g., Ce and Strontium (Sr)). Cyan phosphors are used to convert blue or UV light into cyan light. Cyan phosphors can include Tb and Eu with other compounds (e.g., gadolinium (Gd), aluminum (Al), silicon (Si), oxygen (O), etc.). White phosphors are used to convert blue or UV light into white light. White phosphors can include a blend of red, green, and blue (RGB) phosphors or a combination of blue and yellow phosphors. Alternatively, or in addition, white light can be provided by using a combination of a blue LED with yellow phosphor.

Referring again to FIG. 2, in some embodiments, the faced reflector surfaces 212 serve to reflect light 216 which comes into the airgap 208 between the faced reflector surfaces 212. In some embodiments, a third surface 217 of the light pipe 202 is not coated with reflective material. In some embodiments, the third surface 217 of the light pipe 202 is substantially free of reflective material, meaning that the third surface 217 is free of reflective material, excepting incidental coverage due to the thickness of the faced reflector surfaces 212 (as shown). That is, the third surface 217 can be substantially free of reflective material, excepting only portions of the third surface 217 covered due to a thickness of the respective faced reflector surfaces 212. In this manner, in some embodiments, light 216 is reflected regardless of whether the light 216 is sourced externally (e.g., from ambient conditions such as sunlight, as shown) or internally (e.g., from micro LED(s) 214). The third surface 217 can be positioned between the opposite sidewalls 204, 206 of the thin lens 200 and/or between the faced reflector surfaces 212 (as shown). In some embodiments, the third surface 217 is configured such that light 216 can pass through the third surface 217 and into the airgap 208 (as shown).

Notably, the path of the light 216 will be elongated with respect to the natural path light would take without the presence of the faced reflector surfaces 212 (that is, the straight-line path). In this manner, the faced reflector surfaces 212 offer an infinity mirror effect, and the thin lens 200 therefore looks to be relatively thicker than the actual thickness of the thin lens 200. In other words, the thin lens 200 offers the appearance of a thick lens.

In some embodiments, the thin lens 200 and/or lighting assembly 106 (refer to FIG. 1) can include one or more lighting sources, such as, for example, one or more micro LEDs 214. In some embodiments, the micro LEDs 214 are formed on, or electrically coupled to, a dedicated driving circuit 218 (also referred to as a lighting substrate and/or as a backplane). In some embodiments, the micro LEDs 214 each include a single LED element (refer to FIG. 4B). In some embodiments, the micro LEDs 214 each include a plurality of micro LED elements (as shown).

The thin lens 200 is shown having a particular number of micro LEDs 214 (here, two) for ease of discussion and illustration only. It should be understood, however, that the number, size, configuration, orientation, centerline-to-centerline pitch, etc., of the micro LEDs 214 can vary as required for a given display application. For example, the micro LEDs 214 can include two or more elements (subpixels) of a same color (e.g., blue) and one element of another color(s) (e.g., red, red and green, yellow, etc.). Moreover, it is not necessary that the micro LEDs 214 each include a same number of elements. For example, some of the micro LEDs 214 can include a first number of elements (e.g., 1, 2, 3, 4, 10, etc.) while some of the micro LEDs 214 can include a second (or third, etc.) number of elements (e.g., 1, 2, 3, 4, 10, etc.). All such configurations are within the contemplated scope of this disclosure.

The micro LEDs 214 can be formed from a range of known suitable material(s), such as, for example, semiconductor materials (e.g., silicon, gallium nitride, indium gallium nitride, etc.) and sapphire, depending on the desired emission color of the respective micro LED. For example, gallium nitride (GaN) for blue LEDs, indium gallium nitride (InGaN) for green LEDs, and aluminum gallium indium phosphide (AlGaInP) for red LEDs. In some embodiments, the micro LEDs 214 include several stacked layers, such as an indium gallium nitride/gallium nitride (InGaN/Gan) stack formed on a silicon or sapphire substrate to produce blue and green devices.

In some embodiments, one or more of the micro LEDs 214 are formed on the driving circuit 218. In some embodiments, the driving circuit 218 can include internal electrical connections and components (not separately shown) configured to individually control a respective one of the micro LEDs 214 using electrical signals. For example, a driving circuit 218 can control a respective one of the micro LEDs 214 by selectively passing a driving voltage to the micro LED 214.

Figure 3:
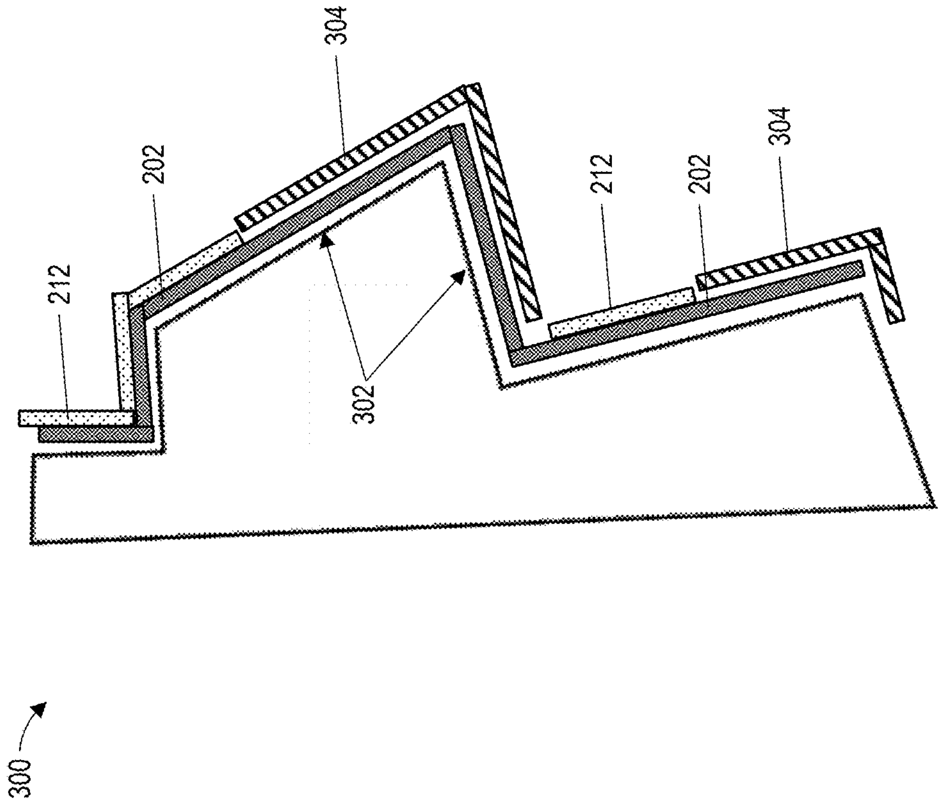
FIG. 3 is an example holding jig for selectively metalizing a thin lens light pipe in accordance with one or more embodiments.

FIG. 3 illustrates an example holding jig 300 for selectively metalizing a thin lens light pipe (e.g., the thin lens 200 of FIG. 2) in accordance with one or more embodiments. As shown in FIG. 3, the holding jig 300 can include a number of surfaces 302 having any desired shape and/or topography. In some embodiments, the light pipe 202 is formed and/or positioned against the surfaces 302 of the holding jig 300, thereby adopting the topography of the surfaces 302. In some embodiments, the holding jig 300 is a molding piece against which the light pipe 202 can be positioned, formed, injected, and/or deposited.

In some embodiments, a masking layer 304 can be placed over portions of the light pipe 202. The masking layer 304 is not meant to be particularly limited, but could include, for example, a photoresist patterned using photolithography techniques to create any desired mask pattern(s), hard masks, such as metallic hard masks such as thin layers of metals including chromium, nickel, and titanium deposited and patterned over the light pipe 202 using techniques like photolithography and etching, oxide hard masks such as silicon dioxide and aluminum oxide, polymer masks such as polyimides, epoxy resins, and/or polyurethanes spin-coated and/or printed onto the light pipe 202 and patterned using techniques like photolithography and laser ablation, self-assembled monolayers (SAMs) formed through chemical adsorption and/or covalent bonding and patterned using techniques like microcontact printing and/or electron-beam lithography, and/or lift-off resists such as sacrificial photoresists that are removed (pulled off, or lifted off) after metal deposition. It should be understood that the particular configuration of the masking layer 304 is shown for illustrative purposes only. The masking layer 304 can have any desired pattern, thereby allowing selective metal deposition onto the unmasked areas of the light pipe 202 as desired.

In some embodiments, faced reflector surfaces 212 are formed on exposed portions of the light pipe 202 (that is, those portions of the light pipe 202 which are not covered by the masking layer 304). There are several processes that can be used to deposit and/or metalize a reflective material coating onto an underlying substrate, and the process is not meant to be particularly limited. In some embodiments, the faced reflector surfaces 212 are formed on the light pipe 202 using physical vapor deposition (PVD), whereby a reflective material (e.g., aluminum, silver, chromium, etc.) is vaporized in a high vacuum environment and then condensed onto the light pipe 202. Vaporization can be achieved by techniques like thermal evaporation, electron-beam evaporation, and sputtering. In some embodiments, the faced reflector surfaces 212 are formed on the light pipe 202 using chemical vapor deposition (CVD), whereby gaseous precursors containing the selected metal species are introduced into a vacuum chamber and the material reacts and deposits as a metal film on the light pipe 202. Other processes are possible, such as electroplating, wet chemical deposition, and spin-on coating, although still other processes are possible and within the contemplated scope of this disclosure. After the deposition and/or metallization process, the light pipe 202 and/or faced reflector surfaces 212 may undergo additional treatments, such as protective coatings, annealing, and/or polishing, to change and/or enhance the reflectivity, durability, and optical properties of the 200.

Figure 4A:
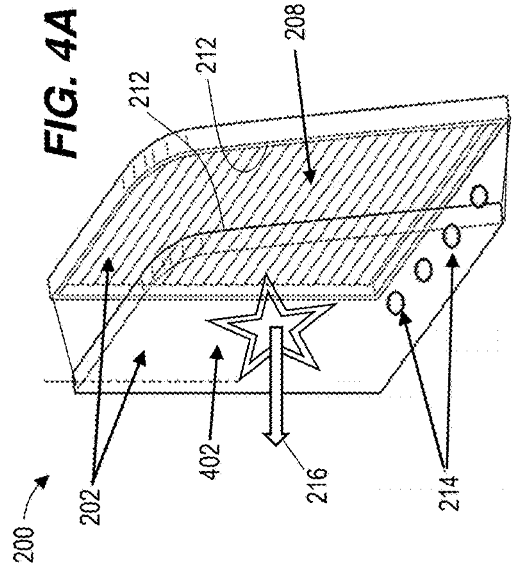
FIG. 4A is a view of an alternative thin lens in accordance with one or more embodiments.

FIG. 4A illustrates a view of an alternative thin lens 200 in accordance with one or more embodiments. The alternative thin lens 200 shown in FIG. 4A can be fabricated in a similar manner and from similar materials as the thin lens 200 shown in FIG. 2, except that the alternative thin lens 200 shown in FIG. 4A can include an opening 402 in one (as shown) or both (not separately shown) of the faced reflector surfaces 212 of the light pipe 202. In this configuration, the opening 402 can be patterned such that the faced reflector surfaces 212 will emit light 216 in any desired shape (that is, in the shape of the opening 402). The shape and/or geometry of the opening 402 is not meant to be particularly limited, but can be shaped, for example, into desired lettering, logos, messaging, patterns, etc., as desired. In configurations where the one or both of the faced reflector surfaces 212 have an opening 402, the light pipe 202 can be similarly patterned and/or made of a transparent and/or semi-transparent material such that light 216 passing through the opening 402 can also pass through the light pipe 202 at the position of the opening 402.

Figure 4B:
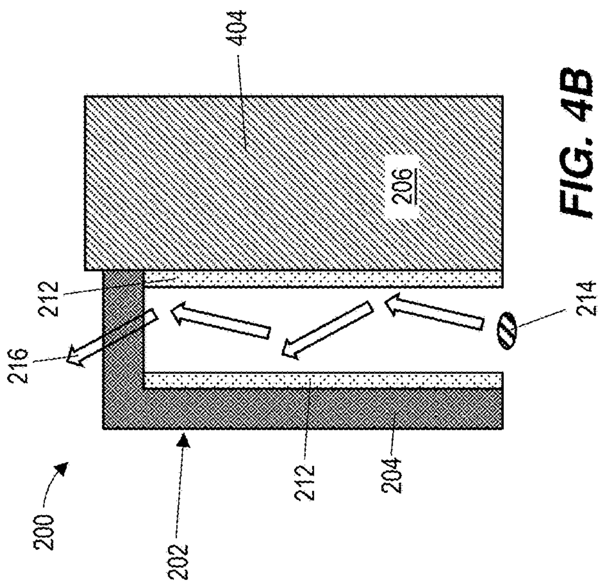
FIG. 4B is a view of an alternative thin lens in accordance with one or more embodiments.

FIG. 4B illustrates a view of an alternative thin lens 200 in accordance with one or more embodiments. The alternative thin lens 200 shown in FIG. 4B can be fabricated in a similar manner and from similar materials as the thin lens 200 shown in FIG. 2, except that in the alternative thin lens 200 shown in FIG. 4B, the light pipe 202 provides one of the opposite sidewalls 204, 206 and a housing 404 (or bezel, etc.) provides the other of the opposite sidewalls 204, 206.

This type of configuration advantageously repurposes the housing 404, thereby avoiding the added weight and manufacturing time and complexity associated with embodiments having a bent light pipe 202 (refer to FIG. 2). This can further reduce weight by roughly half the weight of the light pipe 202.

Figure 4C:
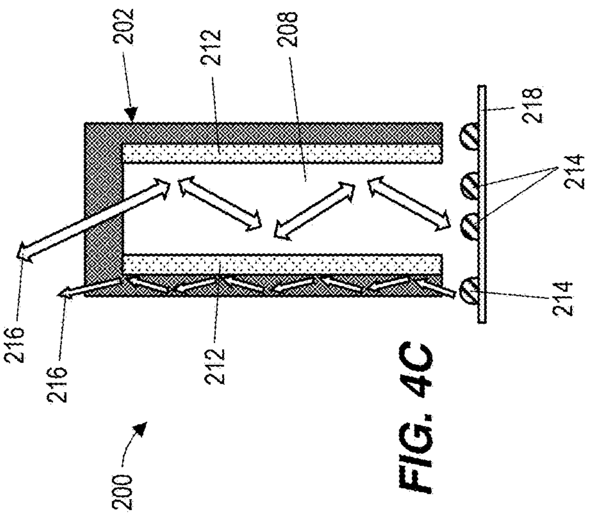
FIG. 4C is a view of an alternative thin lens in accordance with one or more embodiments.

FIG. 4C illustrates a view of another alternative thin lens 200 in accordance with one or more embodiments. The alternative thin lens 200 shown in FIG. 4C can be fabricated in a similar manner and from similar materials as the thin lens 200 shown in FIG. 2, except that in the alternative thin lens 200 shown in FIG. 4C, the micro LEDs 214 are positioned with respect to the faced reflector surfaces 212 such that light 216 is reflected within the airgap 208 and refracted within the light pipe 202. For example, one or more micro LEDs 214 can be positioned in and/or under the airgap 208 for reflecting light and one or more micro LEDs 214 can be positioned in and/or under the light pipe 202 for refracting light. In this configuration the light pipe 202 can be made of a transparent and/or semi-transparent material as previously described.

Figure 4D:
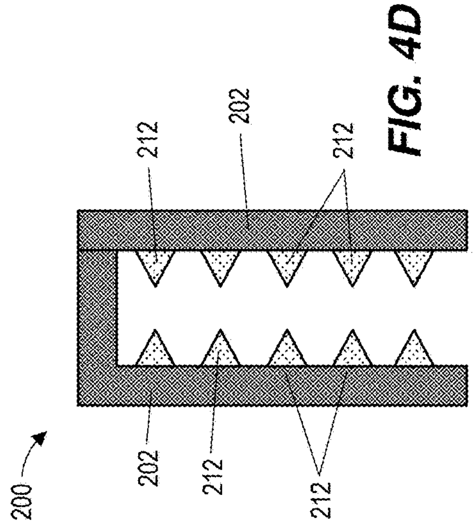
FIG. 4D is a view of an alternative thin lens in accordance with one or more embodiments.

FIG. 4D illustrates a view of an additional alternative thin lens 200 in accordance with one or more embodiments. The alternative thin lens 200 shown in FIG. 4D can be fabricated in a similar manner and from similar materials as the thin lens 200 shown in FIG. 2, except that in the alternative thin lens 200 shown in FIG. 4D, the faced reflector surfaces 212 are shaped into a plurality of reflective elements. The reflective elements can be shaped using any desired masking and/or patterning (refer, e.g., to FIG. 3). The faced reflector surfaces 212 can be made having a same shape, size, and/or orientation (as shown), or alternatively, can be made having different combinations of shape, size, and/or orientation, as desired.

Figure 5A:
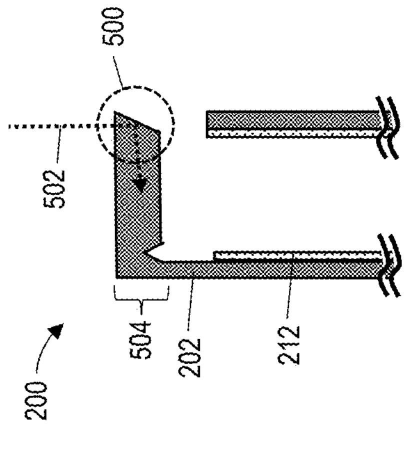
FIG. 5A is a view of an alternative thin lens in accordance with one or more embodiments.

FIG. 5A illustrates a view of an alternative thin lens 200 in accordance with one or more embodiments. The alternative thin lens 200 shown in FIG. 5A can be fabricated in a similar manner and from similar materials as the thin lens 200 shown in FIG. 2, except that in this alternative thin lens 200, a microstructure 500 is shaped, patterned, molded, etc. to obscure underlying component interfaces, to breakup the natural optical read-through along an edge and/or sidewall of the light pipe 202, and/or otherwise to achieve any desired optical characteristic(s). As used herein, a microstructure refers to those portions of the underlying structure (that is, the alternative thin lens 200) which have been varied in geometry and/or reflectance to modify the optical characteristic(s) of ambient light 502 which passes through and/or into the alternative thin lens 200. Microstructures can be fabricated using molding process and/or via the incorporation of reflective surfaces (refer to FIG. 3). For example, in the embodiment shown in FIG. 5A, the microstructure 500 is shaped such that ambient light 502 is reflected within a top portion 504 of the alternative thin lens 200. In this manner, ambient light 502 is diverted along the top portion 504 such that internal structures of the alternative thin lens 200 are obscured, contributing to the effectiveness of the alternative thin lens 200 to appear as a thick lens (refer to FIG. 2).

Figure 5B:
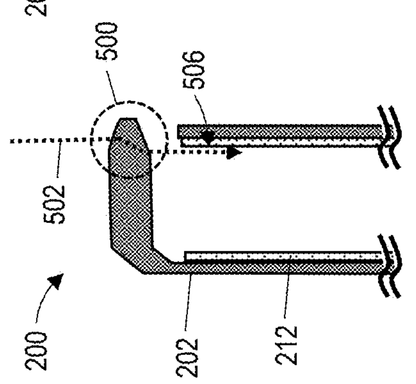
FIG. 5B is a view of an alternative thin lens in accordance with one or more embodiments.

FIG. 5B illustrates a view of an alternative thin lens 200 in accordance with one or more embodiments. The alternative thin lens 200 shown in FIG. 5B can be fabricated in a similar manner and from similar materials as the thin lens 200 shown in FIG. 2, except that in this alternative thin lens 200 a microstructure 500 is shaped, patterned, molded, etc. to obscure underlying component interfaces, to breakup the natural optical read-through along an edge and/or sidewall of the light pipe 202, and/or otherwise to achieve any desired optical characteristic(s). For example, in the embodiment shown in FIG. 5B, the microstructure 500 is shaped such that ambient light 502 is reflected along an edge(s) 506 of one or both of the faced reflector surfaces 212. In this manner, the internal structure of the alternative thin lens 200 is obscured, contributing to the effectiveness of the alternative thin lens 200 to appear as a thick lens (refer to FIG. 2).

Figure 5C:
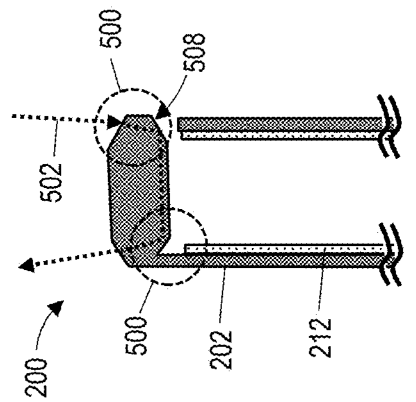
FIG. 5C is a view of an alternative thin lens in accordance with one or more embodiments.

FIG. 5C illustrates a view of an alternative thin lens 200 in accordance with one or more embodiments. The alternative thin lens 200 shown in FIG. 5C can be fabricated in a similar manner and from similar materials as the thin lens 200 shown in FIG. 2, except that in this alternative thin lens 200 a microstructure 500 is shaped, patterned, molded, etc. to obscure underlying component interfaces, to breakup the natural optical read-through along an edge and/or sidewall of the light pipe 202, and/or otherwise to achieve any desired optical characteristic(s). For example, in the embodiment shown in FIG. 5C, the microstructure 500 is shaped such that ambient light 502 that makes contact with an edge(s) 508 of the thin lens 200 is reflected back out of light pipe 202. In this manner, the internal structure of the alternative thin lens 200 is obscured, contributing to the effectiveness of the alternative thin lens 200 to appear as a thick lens (refer to FIG. 2).

Figure 5D:
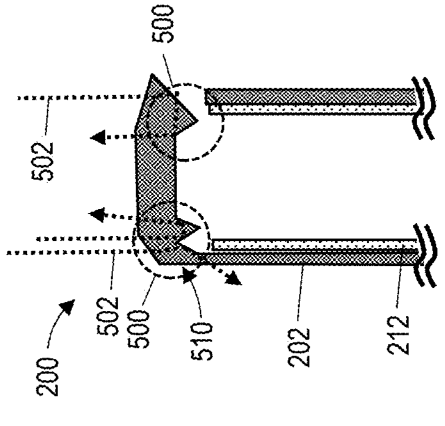
FIG. 5D is a view of an alternative thin lens in accordance with one or more embodiments.

FIG. 5D illustrates a view of an alternative thin lens 200 in accordance with one or more embodiments. The alternative thin lens 200 shown in FIG. 5D can be fabricated in a similar manner and from similar materials as the thin lens 200 shown in FIG. 2, except that in this alternative thin lens 200 a microstructure 500 is shaped, patterned, molded, etc. to obscure underlying component interfaces, to breakup the natural optical read-through along an edge and/or sidewall of the light pipe 202, and/or otherwise to achieve any desired optical characteristic(s). For example, in the embodiment shown in FIG. 5D, the microstructure 500 is shaped such that ambient light 502 is reflected away from an edge(s) 510 of the thin lens 200. In this manner, the internal structure of the alternative thin lens 200 is obscured, contributing to the effectiveness of the alternative thin lens 200 to appear as a thick lens (refer to FIG. 2).

Figure 5E:
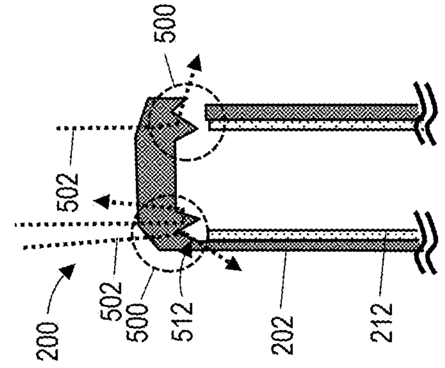
FIG. 5E is a view of an alternative thin lens in accordance with one or more embodiments.

FIG. 5E illustrates a view of an alternative thin lens 200 in accordance with one or more embodiments. The alternative thin lens 200 shown in FIG. 5E can be fabricated in a similar manner and from similar materials as the thin lens 200 shown in FIG. 2, except that in this alternative thin lens 200 a microstructure 500 is shaped, patterned, molded, etc. to obscure underlying component interfaces, to breakup the natural optical read-through along an edge and/or sidewall of the light pipe 202, and/or otherwise to achieve any desired optical characteristic(s). For example, in the embodiment shown in FIG. 5E, the microstructure 500 is shaped such that ambient light 502 is scattered at an edge(s) 512 of the thin lens 200. In this manner, the internal structure of the alternative thin lens 200 is obscured, contributing to the effectiveness of the alternative thin lens 200 to appear as a thick lens (refer to FIG. 2).

Figure 5F:
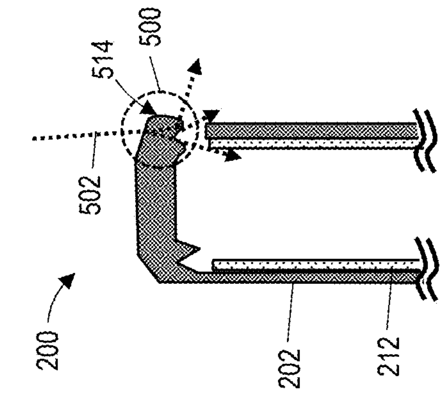
FIG. 5F is a view of an alternative thin lens in accordance with one or more embodiments.

FIG. 5F illustrates a view of an alternative thin lens 200 in accordance with one or more embodiments. The alternative thin lens 200 shown in FIG. 5F can be fabricated in a similar manner and from similar materials as the thin lens 200 shown in FIG. 2, except that in this alternative thin lens 200 a microstructure 500 shaped, patterned, molded, etc. to obscure underlying component interfaces, to breakup the natural optical read-through along an edge and/or sidewall of the light pipe 202, and/or otherwise to achieve any desired optical characteristic(s). For example, in the embodiment shown in FIG. 5F, the microstructure 500 is shaped such that ambient light 502 is split at an edge(s) 514 of the thin lens 200. In this manner, the internal structure of the alternative thin lens 200 is obscured, contributing to the effectiveness of the alternative thin lens 200 to appear as a thick lens (refer to FIG. 2).

Figure 6:
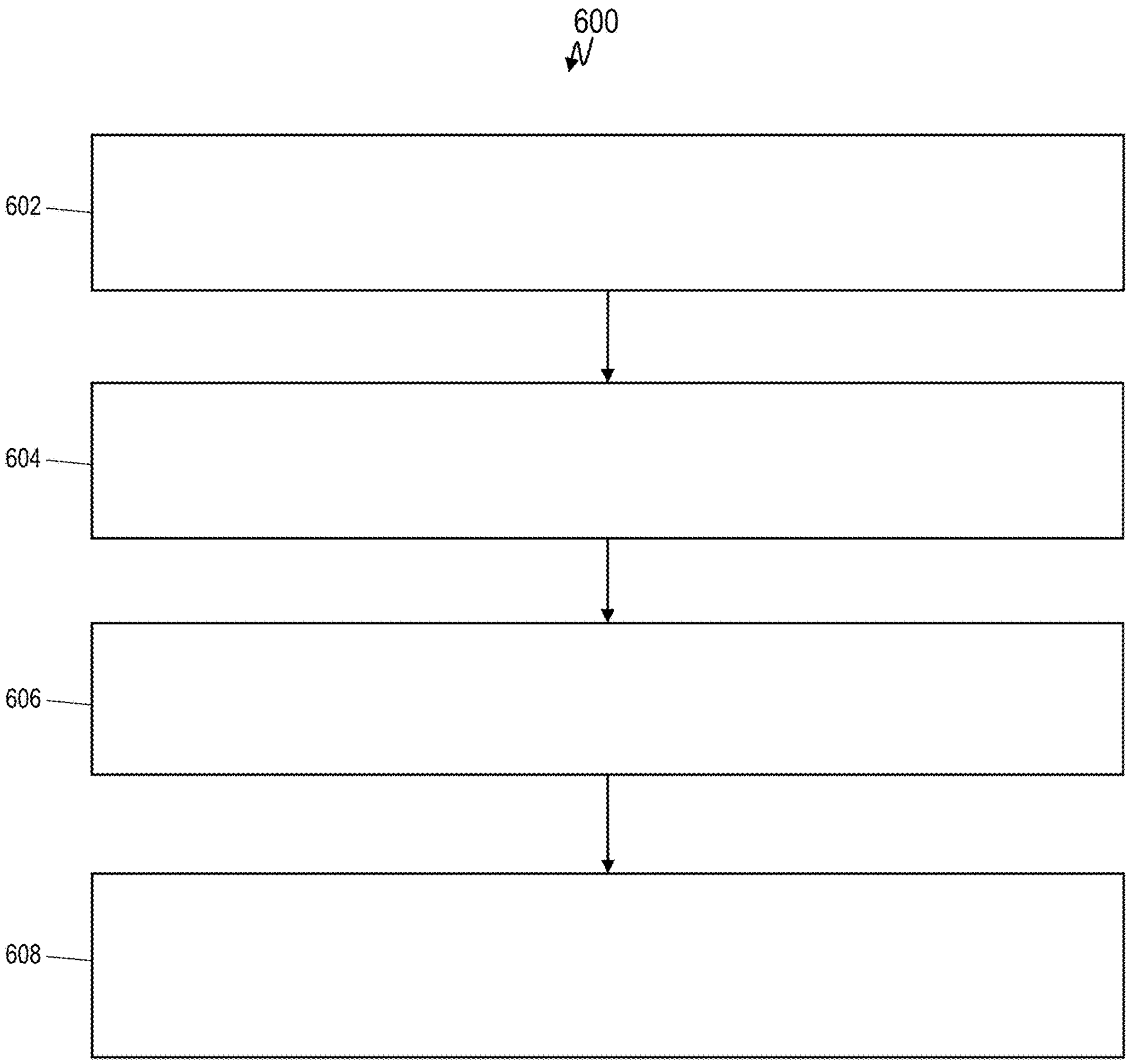
FIG. 6 is a flowchart in accordance with one or more embodiments.

Referring now to FIG. 6, a flowchart 600 for providing a relatively thin lens that leverages reflective surfaces to provide a thick lens appearance is generally shown according to an embodiment. The flowchart 600 is described in reference to FIGS. 1 to 5F and may include additional steps not depicted in FIG. 6. Although depicted in a particular order, the blocks depicted in FIG. 6 can be rearranged, subdivided, and/or combined.

At block 602, the method includes providing a light pipe configured such that opposite sidewalls of the light pipe face each other across an airgap.

At block 604, the method includes forming a first reflector surface on a first sidewall of the opposite sidewalls. In some embodiments, the first reflector surface includes a first reflective material.

At block 606, the method includes forming a second reflector surface on a second sidewall of the opposite sidewalls. In some embodiments, the second reflector surface includes a second reflective material.

At block 608, the method includes forming a third surface positioned between the first reflector surface and the second reflector surface. In some embodiments, the third surface is configured such that light can pass through the third surface and into the airgap. In some embodiments, a path of light within the airgap is elongated due to internal reflections between the first reflector surface and the second reflector surface, thereby providing an infinity mirror effect (refer to FIG. 2).

In some embodiments, the light pipe includes a nominal sidewall thickness of less than 5.0 mm. In some embodiments, the light pipe is a part of, or defines, a lens. Thus, in some embodiments, the light pipe is a thin lens having a nominal sidewall thickness of less than 5.0 mm.

In some embodiments, the third surface is substantially free of reflective material, excepting only portions of the third surface covered due to a thickness of the first reflector surface and a thickness of the second reflector surface.

In some embodiments, the first reflective material and the second reflective material are the same. In some embodiments, the first reflective material and the second reflective material are made of different reflective material(s).

In some embodiments, the component further includes a light source. In some embodiments, the light source includes one or more micro light emitting diodes (LEDs), although other light sources (e.g., halogen, LED, etc.) are possible and within the contemplated scope of this disclosure. In some embodiments, the one or more micro LEDs includes a first micro LED positioned within the airgap such that light emitted from the first micro LED is reflected between the first reflector surface and the second reflector surface through the airgap. In some embodiments, the one or more micro LEDs includes a second micro LED positioned such that light emitted from the second micro LED is refracted against one of the first reflector surface and the second reflector surface through the light pipe.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:

a component comprising a lens, the lens comprising:

a light pipe configured such that opposite sidewalls of the light pipe face each other across an airgap;

a first reflector surface comprising a first reflective material, the first reflector surface formed on a first sidewall of the opposite sidewalls;

a second reflector surface comprising a second reflective material, the second reflector surface formed on a second sidewall of the opposite sidewalls; and a third surface positioned between the first reflector surface and the second reflector surface, the third surface configured such that light can pass through the third surface and into the airgap;

wherein a path of light within the airgap is elongated due to internal reflections between the first reflector surface and the second reflector surface, thereby providing an infinity mirror effect.

2. The vehicle of claim 1, wherein the light pipe comprises a nominal sidewall thickness of less than 5.0 mm.

3. The vehicle of claim 1, wherein the third surface is substantially free of reflective material, excepting only portions of the third surface covered due to a thickness of the first reflector surface and a thickness of the second reflector surface.

4. The vehicle of claim 1, wherein the first reflective material and the second reflective material are the same.

5. The vehicle of claim 1, wherein the component further comprises a light source.

6. The vehicle of claim 5, wherein the light source comprises a first light source positioned within the airgap such that light emitted from the first light source is reflected between the first reflector surface and the second reflector surface through the airgap.

7. The vehicle of claim 6, wherein the light source further comprises a second light source positioned such that light emitted from the second light source is refracted against one of the first reflector surface and the second reflector surface through the light pipe.

8. A lens comprising:

a light pipe configured such that opposite sidewalls of the light pipe face each other across an airgap;

a first reflector surface comprising a first reflective material, the first reflector surface formed on a first sidewall of the opposite sidewalls;

a second reflector surface comprising a second reflective material, the second reflector surface formed on a second sidewall of the opposite sidewalls; and a third surface positioned between the first reflector surface and the second reflector surface, the third surface configured such that light can pass through the third surface and into the airgap;

wherein a path of light within the airgap is elongated due to internal reflections between the first reflector surface and the second reflector surface, thereby providing an infinity mirror effect.

9. The lens of claim 8, wherein the light pipe comprises a nominal sidewall thickness of less than 5.0 mm.

10. The lens of claim 8, wherein the third surface is substantially free of reflective material, excepting only portions of the third surface covered due to a thickness of the first reflector surface and a thickness of the second reflector surface.

11. The lens of claim 8, wherein the first reflective material and the second reflective material are the same.

12. The lens of claim 8, wherein the lens further comprises a light source comprising one or more micro light emitting diodes (LEDs).

13. The lens of claim 12, wherein the one or more micro LEDs comprise a first micro LED positioned within the airgap such that light emitted from the first micro LED is reflected between the first reflector surface and the second reflector surface through the airgap.

14. The lens of claim 13, wherein the one or more micro LEDs comprise a second micro LED positioned such that light emitted from the second micro LED is refracted against one of the first reflector surface and the second reflector surface through the light pipe.

15. A method comprising:

providing a light pipe configured such that opposite sidewalls of the light pipe face each other across an airgap;

forming a first reflector surface on a first sidewall of the opposite sidewalls, the first reflector surface comprising a first reflective material;

forming a second reflector surface on a second sidewall of the opposite sidewalls, the second reflector surface comprising a second reflective material; and forming a third surface positioned between the first reflector surface and the second reflector surface, the third surface configured such that light can pass through the third surface and into the airgap;

wherein a path of light within the airgap is elongated due to internal reflections between the first reflector surface and the second reflector surface, thereby providing an infinity mirror effect.

16. The method of claim 15, wherein the light pipe comprises a nominal sidewall thickness of less than 5.0 mm.

17. The method of claim 15, wherein the third surface is substantially free of reflective material, excepting only portions of the third surface covered due to a thickness of the first reflector surface and a thickness of the second reflector surface.

18. The method of claim 15, wherein the first reflective material and the second reflective material are the same.

19. The method of claim 15, wherein the lens further comprises a light source comprising one or more micro light emitting diodes (LEDs).

20. The method of claim 19, wherein the one or more micro LEDs comprise a first micro LED positioned within the airgap such that light emitted from the first micro LED is reflected between the first reflector surface and the second reflector surface through the airgap.

* * * * *